(12) United States Patent
Williams et al.

(10) Patent No.: US 11,006,662 B1
(45) Date of Patent: May 18, 2021

(54) BEAD FEED UNIT AND METHOD

(71) Applicant: ALTRIA CLIENT SERVICES LLC, Richmond, VA (US)

(72) Inventors: Dwight David Williams, Powhatan, VA (US); Charles David Howe, Crewe, VA (US)

(73) Assignee: Altria Client Services LLC, Richmond, VA (US)

(*) Notice: Subject to any disclaimer, the term of this patent is extended or adjusted under 35 U.S.C. 154(b) by 607 days.

(21) Appl. No.: 15/186,245

(22) Filed: Jun. 17, 2016

Related U.S. Application Data

(60) Provisional application No. 62/182,233, filed on Jun. 19, 2015.

(51) Int. Cl.
| | | |
|---|---|---|
| A24D 3/02 | (2006.01) | |
| B65G 29/00 | (2006.01) | |
| B65G 47/91 | (2006.01) | |
| A24D 3/06 | (2006.01) | |

(52) U.S. Cl.
CPC ......... *A24D 3/0287* (2013.01); *A24D 3/0237* (2013.01); *A24D 3/061* (2013.01); *B65G 29/00* (2013.01); *B65G 47/91* (2013.01); *B65G 2201/0226* (2013.01)

(58) Field of Classification Search
CPC .... A24D 3/0287; A24D 3/061; A24D 3/0237; B65G 29/00; B65G 47/91; B65G 2201/0226
USPC ............. 198/471.2, 397; 452/31; 221/4, 211
See application file for complete search history.

(56) References Cited

U.S. PATENT DOCUMENTS

| | | | | |
|---|---|---|---|---|
| 3,618,820 A | * | 11/1971 | Keeton ..................... | A01C 7/04 221/219 |
| 3,646,942 A | | 3/1972 | Asbill et al. | |
| 3,693,630 A | | 9/1972 | Kastner | |
| 3,844,200 A | | 10/1974 | Sexstone | |
| 3,889,591 A | * | 6/1975 | Noguchi ................. | B41F 17/36 101/37 |
| 3,957,152 A | * | 5/1976 | Heitmann ............... | A24C 5/322 198/462.1 |
| 4,003,277 A | * | 1/1977 | Oesterling ............. | A24C 5/322 83/102 |
| 4,310,476 A | | 1/1982 | Nahra et al. | |
| 4,449,642 A | * | 5/1984 | Dooley ................ | A01C 15/006 111/34 |
| 4,616,662 A | | 10/1986 | Hartmann et al. | |
| 4,619,360 A | * | 10/1986 | Taniguchi ............... | B07C 5/368 198/377.04 |
| 4,664,290 A | * | 5/1987 | Martin .................... | A01C 7/046 221/211 |

(Continued)

*Primary Examiner* — Rakesh Kumar
(74) *Attorney, Agent, or Firm* — Harness, Dickey & Pierce, P.L.C.

(57) ABSTRACT

A bead delivery disk, system and method of delivering flavor beads to a tobacco rod or tow including a bead source, a bead delivery disk in communication with the bead source, including a central disk portion having front and back sides and a first central thickness, an inner annular rim around the central disk portion, the inner annular rim having a second thickness less than said first thickness, a series of pockets spaced around the inner annular rim and multiple vacuum transmission apertures located on one side of the disk, each aperture communicating with at least one of the pockets.

12 Claims, 11 Drawing Sheets

(56) References Cited

U.S. PATENT DOCUMENTS

| | | | |
|---|---|---|---|
| 4,697,721 A * | 10/1987 | Johnson | G07F 11/1657 |
| | | | 221/211 |
| 4,862,905 A | 9/1989 | Green, Jr. et al. | |
| 5,322,495 A | 6/1994 | Budjinski et al. | |
| 5,325,801 A * | 7/1994 | Fiorido | A01C 7/046 |
| | | | 111/185 |
| 5,331,976 A | 7/1994 | St. Pierre | |
| 5,339,871 A | 8/1994 | Collins et al. | |
| 5,431,301 A * | 7/1995 | Suzuki | A24C 5/325 |
| | | | 221/203 |
| 5,531,312 A * | 7/1996 | Dickey | B65G 47/1485 |
| | | | 198/450 |
| 5,875,824 A | 3/1999 | Atwell et al. | |
| 6,598,548 B2 * | 7/2003 | Lempriere | A01C 7/12 |
| | | | 111/178 |
| 6,615,754 B2 * | 9/2003 | Unruh | A01C 7/046 |
| | | | 111/181 |
| 6,723,033 B1 | 4/2004 | Scott et al. | |
| 6,799,413 B2 * | 10/2004 | Aylward | B65B 5/103 |
| | | | 221/131 |
| 6,837,281 B2 | 1/2005 | Spiers et al. | |
| 6,886,683 B1 * | 5/2005 | Kakiuchi | B65G 47/1485 |
| | | | 198/393 |
| 7,255,247 B2 * | 8/2007 | Aylward | B65B 35/08 |
| | | | 221/168 |
| 7,479,098 B2 | 1/2009 | Thomas et al. | |
| 7,727,637 B2 | 6/2010 | Park | |
| 7,972,254 B2 | 7/2011 | Stokes et al. | |
| 7,975,877 B2 | 7/2011 | Garthaffner et al. | |
| 8,006,826 B2 * | 8/2011 | Licht | B65G 47/848 |
| | | | 198/471.1 |
| 8,095,235 B2 * | 1/2012 | Tzeng | A61J 7/0409 |
| | | | 700/232 |
| 8,291,916 B2 | 10/2012 | Belcastro et al. | |
| 8,303,474 B2 | 11/2012 | Iliev et al. | |
| 8,308,623 B2 | 11/2012 | Nelson et al. | |
| 8,381,947 B2 | 2/2013 | Garthaffner et al. | |
| 8,574,141 B2 | 11/2013 | Barnes et al. | |
| 8,622,882 B2 | 1/2014 | Nikolov et al. | |
| 8,747,876 B2 | 6/2014 | Park | |
| 8,869,969 B2 | 10/2014 | Cieslikowski et al. | |
| 8,882,647 B2 | 11/2014 | Thomas et al. | |
| 8,925,471 B2 * | 1/2015 | Adams | A01C 7/046 |
| | | | 111/185 |
| 9,137,942 B2 * | 9/2015 | Adams | A01C 7/046 |
| 9,426,940 B2 * | 8/2016 | Connors | A01C 7/105 |
| RE46,910 E * | 6/2018 | Aylward | B65B 35/26 |
| 10,149,425 B2 * | 12/2018 | Berendsen | A01C 7/044 |
| 2003/0116068 A1 * | 6/2003 | Sauder | A01C 21/005 |
| | | | 111/180 |
| 2005/0224510 A1 * | 10/2005 | Remis | G16H 20/13 |
| | | | 221/69 |
| 2007/0012327 A1 | 1/2007 | Karles et al. | |
| 2008/0061074 A1 * | 3/2008 | Remis | B65B 57/20 |
| | | | 221/69 |
| 2009/0218363 A1 * | 9/2009 | Terzini | B65B 5/103 |
| | | | 221/4 |
| 2011/0111239 A1 | 5/2011 | Dandekar et al. | |
| 2011/0139141 A1 | 6/2011 | Shaffer et al. | |
| 2011/0155154 A1 | 6/2011 | Zhuang et al. | |
| 2012/0028774 A1 | 2/2012 | Ercelebi et al. | |
| 2012/0037172 A1 | 2/2012 | Allen et al. | |
| 2012/0245006 A1 | 9/2012 | Henley et al. | |
| 2012/0282408 A1 | 11/2012 | Jacob et al. | |
| 2013/0180827 A1 | 7/2013 | Cieslikowski et al. | |
| 2014/0011652 A1 | 1/2014 | Cieslikowski et al. | |
| 2014/0196729 A1 | 7/2014 | Ercelebi et al. | |
| 2014/0239006 A1 | 8/2014 | Garthaffner et al. | |

* cited by examiner

BEAD FEED UNIT AND METHOD

This patent application claims priority to U.S. Provisional Application Ser. No. 62/182,233, filed on Jun. 19, 2015, (Attorney Docket 400276-20062), the contents of each are hereby incorporated by reference in their entirety.

FIELD

Disclosed herein is a bead feeding apparatus for picking up individual beads from a supply of beads and delivering them to a moving stream of material such as a stream of cellulose acetate tow in the course of manufacturing smoking rods for use in smoking articles of any type or other utilities.

Environment

It is frequently desired to enhance the flavor of smoking articles by introducing a flavorant into the mainstream smoke or vapor, such as menthol, or other flavors.

Some proposed cigarettes have hollow objects positioned in their filter elements, and the contents of those objects reportedly are released into the filter elements upon rupture of those objects in the attempt to alter the nature or character of the mainstream smoke passing through those filter elements. Some proposed cigarettes have capsules positioned in their filter elements, and the contents of those capsules reportedly are released into the filter elements upon rupture of those capsules in order to deodorize the filter element after the cigarette is extinguished. Some smokers might desire a cigarette that is capable of selectively providing a variety of different flavors, depending upon the smoker's immediate desire. The flavor of such a cigarette might be selected based on the smoker's desire for a particular flavor at that time, or a desire to change flavors during the smoking experience. For example, changing flavors during the smoking experience may enable a smoker to end the cigarette with a breath freshening agent or a flavor, such as menthol or spearmint. Accordingly, it would be desirable to provide a cigarette that is capable of providing distinctive, different pleasurable sensory experiences, at the discretion of a smoker.

It would be highly desirable to provide a smoker with the ability to enhance his/her smoking experience, such as can be accomplished by allowing the smoker to purposefully select certain characteristics or behaviors that the cigarette exhibits. That is, it would be desirable to provide a cigarette possessing components that can be employed so as to allow the smoker to alter, in a controlled way, the nature or character of the mainstream smoke produced by that cigarette. In particular, it would be desirable to provide a cigarette that is capable of selectively releasing an agent for enhancing the sensory attributes of the mainstream smoke (e.g., by flavoring that smoke). More particularly, it would be desirable to provide the means to manufacture such cigarettes incorporating such selectively-releasable flavor agents and the like in a rapid, highly-automated fashion. It also would be desirable to provide improved means to incorporate smoke-altering solid objects such as flavor pellets, exchange resin beads and adsorbent/absorbent particles into cigarette filters, in a rapid, highly automated fashion.

However, it has been found that during manufacturing of smoking rods containing flavor beads or the like, it is difficult to obtain proper registration or consistent positioning of the beads within the tobacco rods or filter tows during high speed production. Improper or inconsistent registration can result in off-specification product, which must be identified and removed from the production stream at great expense and time.

Despite recent advances, there remains an unmet need in the art to insert flavor beads into rods and tows with consistent and accurate registration within the rod/tow, so as to reduce or eliminate off-specification products.

SUMMARY

Provided is a single disk having circumferential pockets to pick up flavor beads from a source of beads and consistently deliver individual beads to a proper point within a moving stream of fibrous material, such as a filter tow, such that a proper registration is provided to avoid off-specification products. The location of the beads can be configured to have controlled spacing both linearly and radially within the rod axis.

In one form, disclosed is a bead delivery disk comprising a central disk portion having front and back sides and a first central thickness, an inner annular rim around the central disk portion, the inner annular rim having a second thickness less than said first thickness, a series of pockets spaced around said inner annular rim, and multiple vacuum transmission apertures located on one side of the disk, each aperture communicating with at least one of the pockets.

In another form, the vacuum transmission apertures are located in a generally circular pattern around said back side of the central disk portion, radially inside of the inner annular rim. For example, the vacuum transmission apertures can be perforations on the surface of the back side which fluidly communicate with the pockets through passages inside said disk.

Advantageously, the bead delivery disk further includes a semi-annular vacuum plenum affixed to the back side of said disk covering said vacuum transmission apertures and having one or more vacuum delivery ports provided therein, preferably such that an upper terminus of the vacuum plenum is located at about zero degrees on top of the back side of said disk and a lower terminus of said vacuum plenum is located at about 165 degrees relative to the top and front side of the disk. Additionally, the bead delivery disk can further comprise a pressurized gas delivery means located at about 180 degrees relative to the top of the disk.

In another form, the pockets are each sized to pick up and deliver a single bead.

In another form, the bead delivery disk also includes an outer annular rim disposed around the inner annular rim, and each pocket is disposed between a leading rim portion and a trailing rim portion of the outer annular rim, the outer annular rim having a third thickness less than said second thickness. Preferably, the beads to be picked up and delivered have a nominal diameter greater than the third thickness and less than the second thickness.

In a preferred form, each pocket has a spherical seat formed on the inner annular rim between leading and trailing rim portions of the outer annular rim of the disk, each seat communicating with a passage disposed within the disk, and more preferably each passage communicating with a single vacuum transmission aperture. It can be advantageous if a center of a nominal bead is disposed a first height Hc above an outer periphery of the inner annular rim when the nominal bead is seated in the pocket, the trailing rim portion having a height greater than the first height Hc, and the leading rim portion having a height less than the first height Hc.

In another form, disclosed is a bead delivery system, having a source of beads, a bead delivery disk in communication with the bead source, which includes a central disk portion having front and back sides and a first central thickness, an inner annular rim around the central disk portion, the inner annular rim having a second thickness less than the first thickness, a series of pockets spaced around the inner annular rim, and multiple vacuum transmission apertures located in a generally circular pattern around one side of the disk, each aperture communicating with at least one of the pockets; and a bead receiving means structured to receive beads from the pockets of the bead delivery disk into a moving stream of fibrous material.

Additionally, the bead receiving means can further include a stuffer jet, a receiving funnel downstream of the stuffer jet, a frusto-conical tongue downstream of the funnel, which has a first wide end, a second narrow end, upper and lower portions between the ends, a pathway through the lower portion, and a slot in the upper portion of a width to freely accommodate the second thickness of the inner annular rim of the bead delivery disk, but narrower than the first central thickness, wherein the tongue is structured and arranged to receive and wrap a generally flat, moving stream of fibrous material into a continuous cylinder; and a tube belt passing along the lower portion of the tongue and disposed below the pathway.

In a preferred form, the slot is positioned closer to the second, narrow end of the tongue than to the first, wide end of the tongue, and structured such that the slot has a width to freely admit the beads into the moving stream of fibrous material.

Advantageously, the disk of the bead delivery system is structured such that the vacuum transmission apertures are located on the back side of the disk, radially inside of the inner annular rim, and can be perforations on the surface of the back side which fluidly communicate with the pockets on the circumference of the disk through passages inside the disk.

In a preferred form, the bead delivery disk of the system further comprises a semi-annular vacuum plenum affixed to the back side thereof, covering a portion of the vacuum transmission apertures, and having one or more vacuum delivery ports provided therein. The vacuum plenum is positioned such that an upper terminus of the vacuum plenum is located at about zero degrees on top of the back side of the disk and a lower terminus of the vacuum plenum is located at about 165 degrees relative to the top and front of the disk. Also, the bead delivery system can further comprise a gas pressure delivery means, such as a separate plenum provided with a separate gas pressure delivery port, or a pressurized gas nozzle, located at about 180 degrees relative to the top of the disk.

In one form, the pockets are each sized to pick up and deliver a single bead, said bead delivery disk further comprising an outer annular rim disposed about said inner annular rim, wherein each pocket is disposed between a leading rim portion and a trailing rim portion of said outer annular rim, said outer annular rim having a third thickness less than said second thickness. Preferably, the beads to be picked up and delivered have a nominal diameter greater than the third thickness and less than said second thickness.

In another form, each pocket has a spherical seat formed on the inner annular rim and between leading and trailing rim portions of the outer annular rim of the disk, each seat communicating with at least one passage disposed within the disk, and preferably each passage communicating with a single vacuum transmission aperture. Advantageously a center of a nominal bead is disposed a first height Hc above an outer periphery of the inner annular rim when the nominal bead is seated in the pocket, the trailing rim portion having a height greater than the first height Hc, and the leading rim portion having a height less than the first height Hc.

In another form, the bead source is a vibrating hopper containing beads positioned vertically above the bead delivery disk. Alternatively, the bead source comprises an accumulator wheel having a central bead reservoir and a series of radial spokes extending from the reservoir, the accumulator wheel positioned above a transfer wheel having pockets for the beads on a peripheral edge thereof, such that the end of each spoke communicates with a pocket on the peripheral edge of the transfer wheel.

In another form, disclosed is a process of positioning a bead within a rod of fibrous material comprising drawing a stream of fibrous material through a frusto-conical tongue of a rod forming apparatus; capturing and registering a bead on a pocket at a location along a periphery of a delivery disk with vacuum by rotating said disk and moving said pocket through a source of beads; releasing said bead at a desired position in said drawn stream of fibrous material by further rotating said delivery disk and further moving said captured bead through said frusto-conical tongue; and maintaining registry of said captured on said pocket during at least one of said moving and further moving by disposing leading and trailing outer rim portions adjacent said pocket, said rim portions having a width less than a nominal diameter of said bead.

In one form of the process, the periphery has a width greater than the nominal diameter by a minor fraction of the nominal diameter.

In a preferred form of the process, the delivery rate of the beads is matched to a speed of the stream of fibrous material as it is drawn through the tongue. Additionally, the beads are wrapped into the drawn stream of fibrous material as they exit the frusto-conical tongue and form a continuous rod. In this way, beads are immediately wrapped into the continuous rod and constricted from radial displacement within the rod.

In another form of the process, the bead delivery disk is vertically rotated in communication with the source of beads, the beads are individually delivered into each pocket, and the delivery disk and pockets have vacuum applied to them until a bead is delivered into the drawn stream of fibrous material with a positive gas pressure blast.

In another form, disclosed is a bead delivery disk comprising a disk having front and back sides, a circumference and a first central thickness; an inner annular rim around the circumference of the disk having a second thickness less than the first thickness; an outer annular rim around a circumference of the inner annular rim having a third thickness less than the second thickness; and a series of pockets spaced around the inner rim connectable to a vacuum source.

In addition, the outer annular rim of the bead delivery disk comprises leading and trailing rim portions disposed on either side of each pocket, said leading rim portions having lesser heights relative to heights of said trailing rim portions, and a center of a nominal bead is disposed a first height Hc above an outer periphery of the inner annular rim when the nominal bead is seated in the pocket, the trailing rim portion having a height greater than the first height Hc, and the leading rim portion having a height less than the first height Hc.

Advantageously, each pocket has a spherical seat formed on the inner annular rim and between the leading and trailing rim portions on the outer annular rim, each seat communicating with a passage disposed within the disk.

In another form is presented a rotatable disk for repetitively delivering beads of a nominal diameter, comprising a central disk portion of a first thickness, said central disk portion providing an annular vacuum array; an inner rim portion disposed about said central disk portion having a second thickness less than said first thickness, said second thickness greater than said nominal diameter by a minor fraction of said nominal diameter, said inner rim portion including an array of pockets at spaced locations along an outer circumference of said inner rim; for each said pocket, a vacuum passage structured to communicate vacuum to said pocket from said vacuum array; and an outer rim portion disposed about said inner rim portion having a third thickness less than said nominal diameter, said outer rim portion comprising a leading rim portion and a trailing rim portion adjacent each pocket, said trailing and leading rim portions abating disturbance of a bead retained in a respective pocket as said pocket is moved through a fibrous stream during a rotation of said disk.

BRIEF DESCRIPTION OF THE DRAWINGS

The forms disclosed herein are illustrated by way of example, and not by way of limitation, in the figures of the accompanying drawings and in which like reference numerals refer to similar elements and in which.

DETAILED DESCRIPTION

Figure 1A:
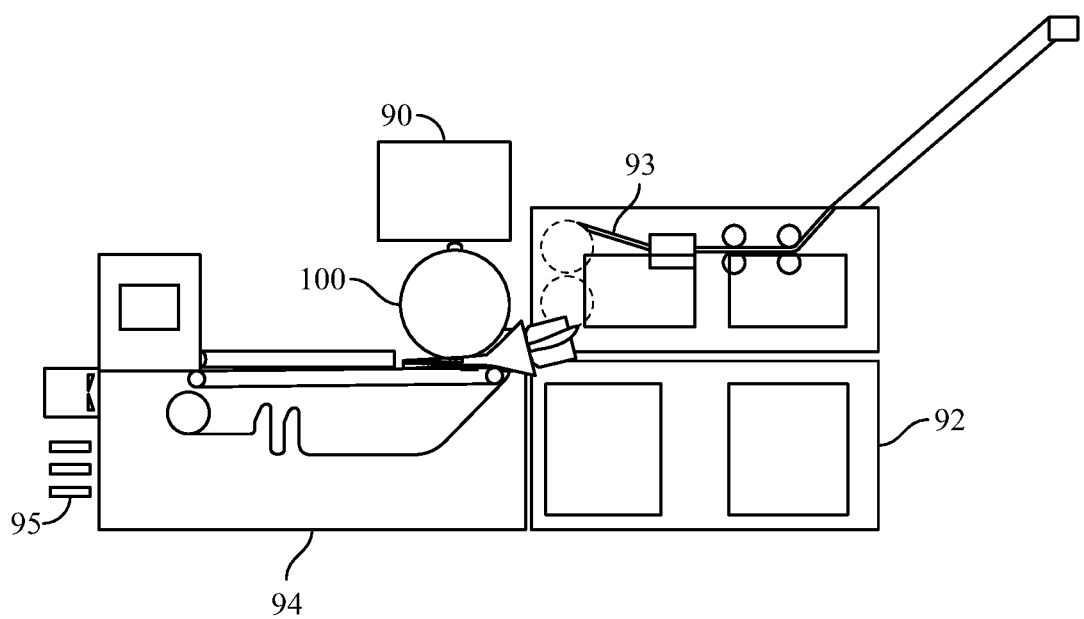
FIG. 1A presents a schematic view of a filter rod forming apparatus incorporating the bead delivery system of the present disclosure.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-6B, wherein like numerals are used to designate like elements throughout.

Each of the following terms written in singular grammatical form: "a," "an," and "the," as used herein, may also refer to, and encompass, a plurality of the stated entity, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

It is frequently desired to enhance the flavor of inhaled products, such as tobacco products, by incorporating into the inhalation stream a flavoring system, such as a collection of flavored particles, or by insertion of generally spherical, porous flavor beads, which are larger and easier to handle than flavored particles, into such as a tobacco rod or filter tow to provide the desired flavor. It would be highly desirable to provide a smoker with the ability to enhance his/her smoking experience, such as can be accomplished by allowing the smoker to purposefully select certain characteristics or behaviors that the cigarette exhibits. That is, it would be desirable to provide a cigarette possessing components that can be employed so as to allow the smoker to alter, in a controlled way, the nature or character of the mainstream smoke or vapor produced by that cigarette. In particular, it would be desirable to provide a cigarette that is capable of selectively releasing an agent for enhancing the sensory attributes of the mainstream smoke (e.g., by flavoring that smoke). More particularly, it would be desirable to provide the means to manufacture such cigarettes incorporating such selectively-releasable flavor agents and the like in a rapid, highly-automated fashion. It also would be desirable to provide improved means to incorporate smoke-altering solid objects such as flavor beads and/or exchange resin beads into cigarette filters, in a rapid, highly automated fashion.

Current systems for delivering and depositing flavor beads into tobacco rods and filter tow do not always result in proper registration of the flavor beads in the rod/tow, especially during high speed production. Improper or inconsistent registration can result in off-specification product which must be identified and removed from the production stream at great expense and time.

To address these problems, the present disclosure provides a single disk having circumferential pockets to pick up flavor beads from a source of beads and consistently deliver individual beads to a proper point within a moving rod/tow, such that a proper registration is provided both linearly along and radially within the rod axis.

Figure 1B:
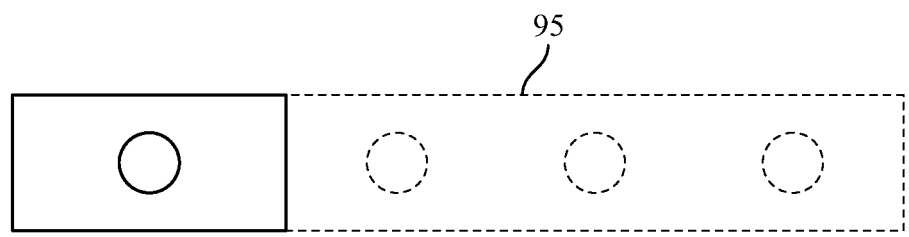
FIG. 1B presents a view of single and multi-filter constructions produced according to the present disclosure.

Referring to FIG. 1A, in an embodiment, a first apparatus 92 draws a ribbon of fibrous material 93, conditions it for rod formation and delivers it to a second apparatus 94, which transforms the stream of conditioned, fibrous material into a continuous rod form, optionally folds a wrap about the rod form and cuts the rod form into individual pieces 95. In the context of manufacturing filter rods for smoking articles such as cigarettes, the fibrous material may be cellulose acetate tow, a suitable first apparatus 92 may be a Hauni AF-1 and a suitable second apparatus may be a Hauni KDF-2 that has been modified in accordance with the teachings herein. The cut pieces 95 may be of a single filter construction as shown in FIG. 1B with heavy lines, or more preferably, a multi-filter construction such as shown in dotted lines in FIG. 1B. The wheel pitch, defined as the circumference spacing between bead pockets 140, is adapted to match the desired bead spacing distance in the cut pieces 95. A bead delivery disk 100 may be further characterized as having a specific wheel pitch. In operation, to meet product requirements, the appropriate bead delivery disk 100 having the desired wheel pitch, is installed in the bead delivery system.

Figure 2B:
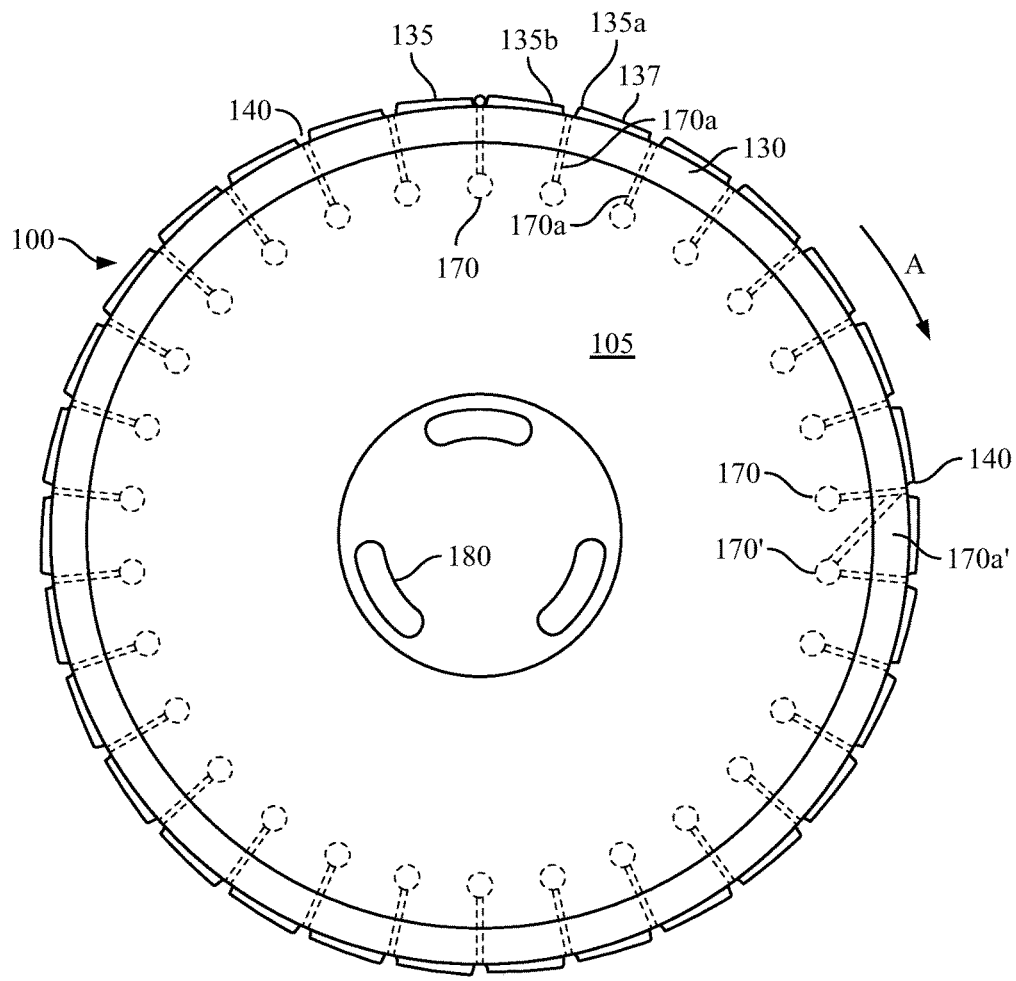
FIGS. 2A and 2B present front side and edge-on views, respectively, of a bead delivery disk according to the present disclosure.
Figure 2A:
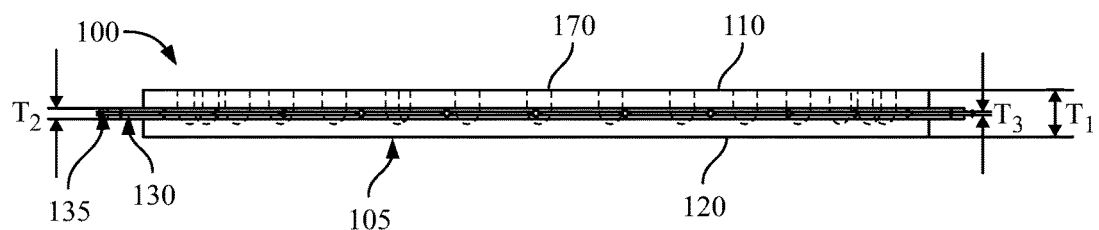
Figure 4A:
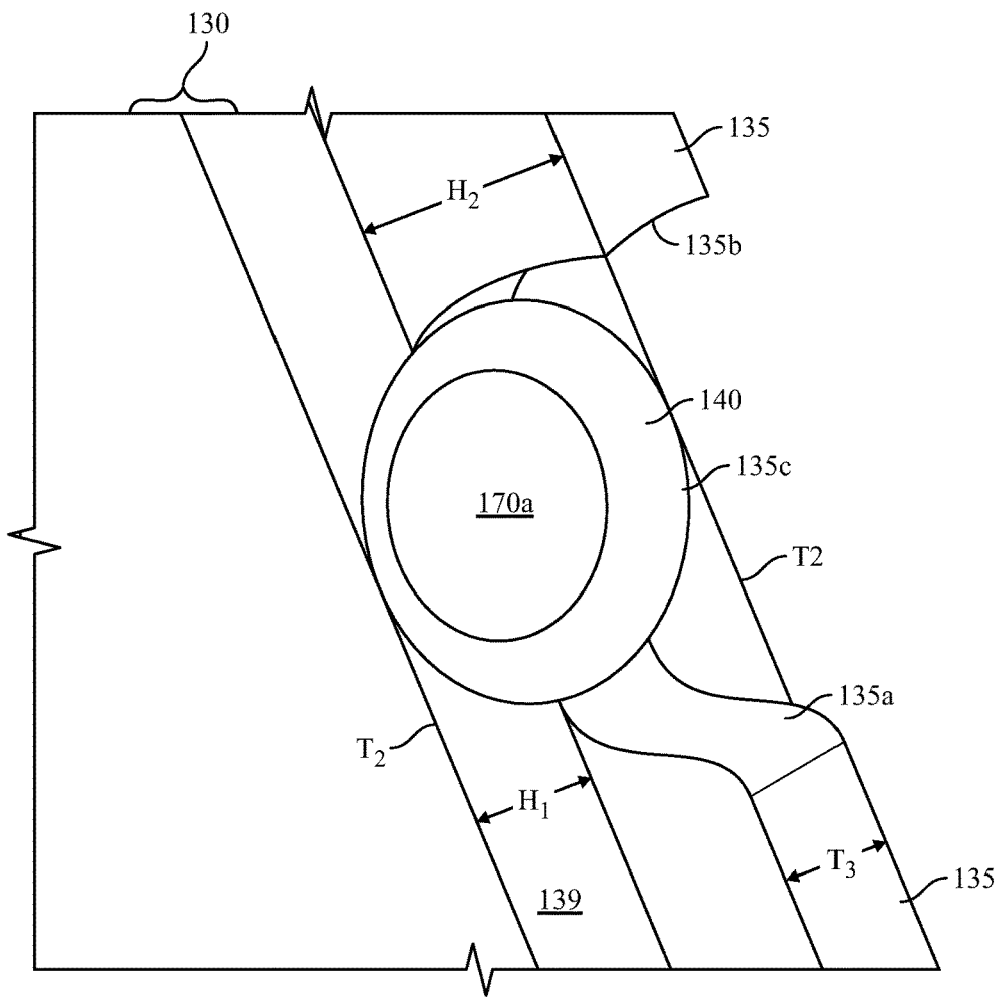
FIGS. 4A-4D present detailed views of a single pocket and groups of pockets according to the present disclosure.

FIGS. 2A and 2B provide a front side and edge view, respectively, of a bead delivery disk 100 of an embodiment, having a backside 110 and a front side 120. In an embodiment, the delivery disk 100 comprises a central disk portion 105 having a first central thickness T1 sufficient for the establishment of a plurality (array) of vacuum transmission apertures 170 on back side 110 (shown in phantom on front side view of FIG. 2A) and within the central disk portion 105; an inner annular rim 130 having a second thickness T2 which is less than the first thickness T1 but fractionally larger than the nominal thickness of a bead; and an outer annular rim 135 having a thickness T3 which is less than T2 of the inner annular rim 130 and less than the nominal diameter of the bead, preferably approximately half of the nominal diameter of the bead. A series of circumferentially spaced-apart pockets 140 are disposed along the periphery of the inner annular rim 130, each pocket 140 comprising a pocket seat 135c (FIG. 4A) disposed between a leading rim portion 135a of the outer rim 135 and a trailing ("push") rim portion 135b of the outer annular rim 135. The terms "leading" and "trailing" are relative to the direction of rotation A of bead delivery disk 100. Each pocket 140 is spaced along outer annular rim 135. An arcuately tapered segment 137 of the outer rim 135 provides transition between a leading rim portion 135a adjacent one pocket 140 and a trailing rim portion 135b adjacent an immediately preceding pocket 140. The trailing rim portions 135b have a height H2 greater than the height H1 of the leading rim portions 135b relative to the circumferential surface 139 of the inner annular ring 130 (FIG. 4A). The leading and trailing rim portions 135a and 135b facilitate bead pickup, retention and consistent delivery of the beads. The central portion 105 of the disk 100 includes one or more mounting apertures 180 for attachment of the disk to a rotational drive device such as a motor or a motor driven shaft.

The vacuum transmission apertures 170 are located generally around an outer face of central portion 105 of said disk 100, radially inside of said inner annular rim 130, such as in a circle around the surface of the back side 110 of disk 100. The vacuum transmission apertures 170 are perforated into (but not through) disk 100 from their locations on the back side 110 thereof to fluidly communicate through vacuum transmission passages 170a inside the disk with the pockets 140 on the circumference of the disk. In the exemplary embodiments, a single pocket 140 communicates with a single vacuum aperture 170 through a radially directed vacuum transmission passage 170a. It is contemplated that in addition, the single pocket 140 may be communicated with a second vacuum aperture 170' through a second vacuum transmission passage 170a'. Preferably the second vacuum aperture 170' leads the aforementioned first pocket 140. The second vacuum transmission passage 170a' may intersect the pocket 140 at an angle relative to the first radially oriented vacuum transmission passage 170a.

Figure 3:
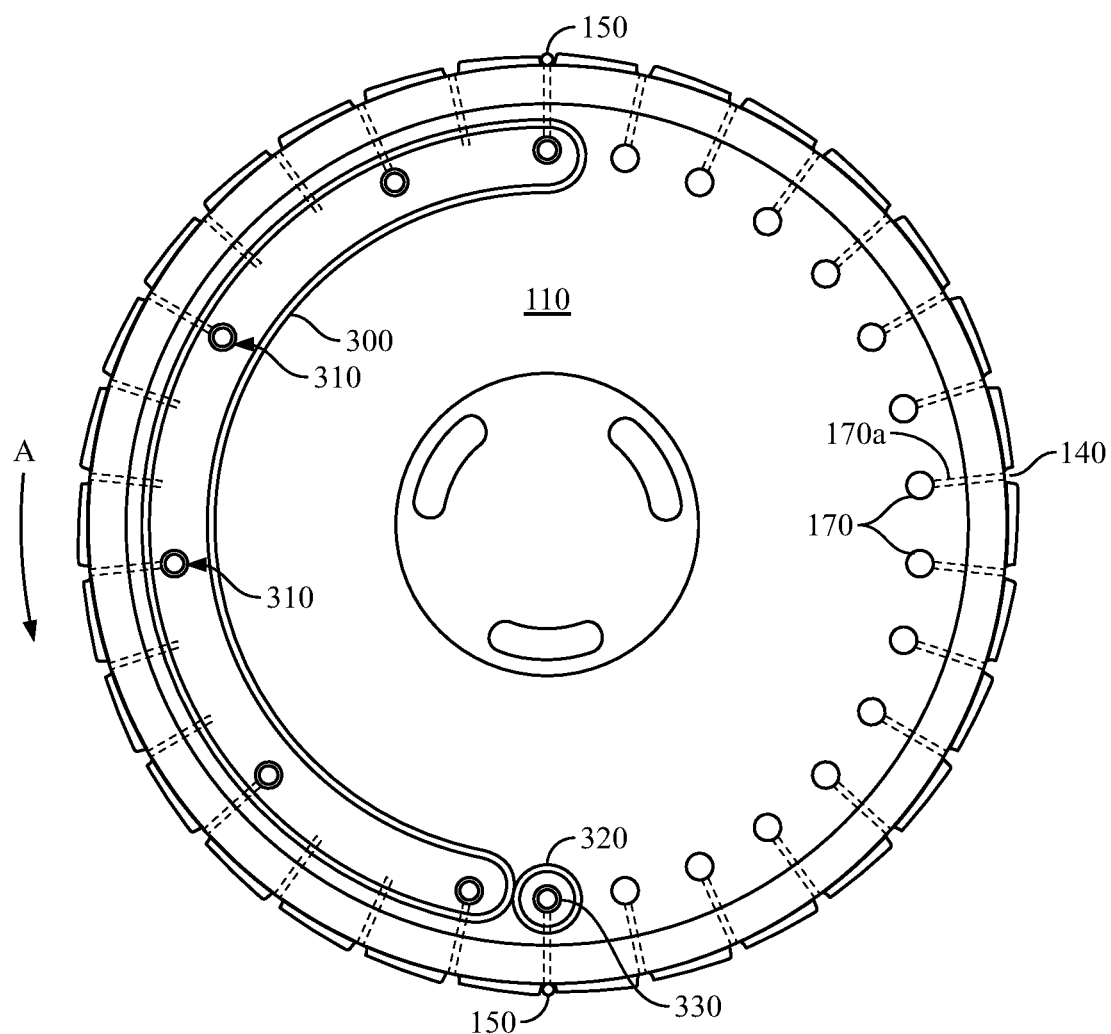
FIG. 3 presents a rear side view of a bead delivery disk including a vacuum plenum according to the present disclosure.

As shown in FIG. 3, the bead delivery disk further comprises a semi-annular vacuum plenum 300 affixed against one side of said disk, preferably backside 110, to communicate with said vacuum transmission apertures 170 and one or more of the vacuum transmission passages 170a provided in the disk. Advantageously, vacuum is provided to the semi-annular vacuum plenum 300 through one or more vacuum delivery ports 310 distributed around the plenum which are connected to a vacuum source (not shown). The vacuum plenum 300 is arranged such that one end is at an uppermost portion at about 12:00 on a clock face, or zero degrees on a circle, of bead delivery disk 100, and the other end terminates annularly just before the lower-most portion, at about 5:30 on a clock face or about 165 degrees relative to the front side of the bead delivery disk, the vacuum plenum 300 covering the vacuum transmission apertures 170 on one side of the disk to enable pulling a vacuum through vacuum transmission passages 170a and pockets 140. In this way, the vacuum assists capture of a bead 150 in each of pockets 140 at the top of the wheel as it rotates in direction A through a bead source 90 (FIG. 1), and to maintain the bead within the pockets as the disk rotates. Upon reaching the lower-most portion of the wheel (6:00 position or 180 degrees) the vacuum is terminated and a positive gas pressure blast, such as a puff of air, is delivered into the lower-most vacuum transmission aperture 170 through a gas pressure delivery means 320, such as a gas pressure plenum which is provided with a pressurized gas port 330, to help dislodge the bead 150. Of course, the positive pressure plenum can be substituted with a gas pressure nozzle or the like, directed into the lowermost vacuum transmission aperture. The amount of pressure necessary to positively dislodge the flavor bead is only about 20 psig. In the alternative, the terminal portion of the vacuum plenum can extend to the lower-most portion of the bead delivery disk and can be sealed from the remainder of the plenum, in which case this sealed portion can be provided with a separate pressurized gas delivery port 330. A satisfactory vacuum-tight seal is maintained between the plenum(s) and the face portion of the disk with a soft, but dense material, such as felt, deposited on the disk-contacting edges of the plenum. The vacuum design of the bead delivery disk represents a step forward in simplicity and cost savings as compared to conventional vacuum drums.

In a preferred form as shown in FIG. 4A, which is a perspective view of an individual bead delivery pocket 140, inner annular rim 130 having a thickness T2 is shown with the corresponding portions of a bead delivery pocket 140 disposed on the circumferential surface of inner annular rim 130 in gaps of the outer annular rim 135, which itself has a thickness T3. Vacuum transmission passage 170a terminates at the periphery of the inner annular rim 130, which has a spherical seat portion 135c of pocket 140 therein. The spherical seat 135c conforms to the generally spherical shape of a flavor bead (not shown). As discussed above, vacuum transmission passage 170a provides for transmission of vacuum or gas pressure to the pocket 140 to assist in pickup and delivery of the flavor bead, respectively. On either side of each spherical seat 135c are the leading and trailing portions of outer annular rim 135: a leading rim portion 135a (relative to the direction of rotation of the disk 100) and a trailing rim portion 135b. Leading rim portion 135a has a height H1 from the circumferential surface of inner annular rim 130, which is less than a height H2 of trailing rim portion 135b. The height difference is advantageous because the lower height H1 of leading rim portion 135a presents less restriction to capture of a bead as bead delivery disk 100 rotates past a source of beads 90 (FIG. 1), since the generally spherical beads can roll along the ridge of leading rim portion 135a and drop into pocket seat 135c. The greater height H2 of trailing rim portion 135b is advantageous because it stabilizes the bead as it moves with the bead delivery disk 100, and in pushing the captured bead into contact with the moving stream of fibrous material just prior to it being deposited therein. In an embodiment, the trailing rim portion 135b has a height greater than about one half a nominal bead diameter, and the leading rim portion 135a has a height less than about one half the nominal bead diameter.

Figure 4B:
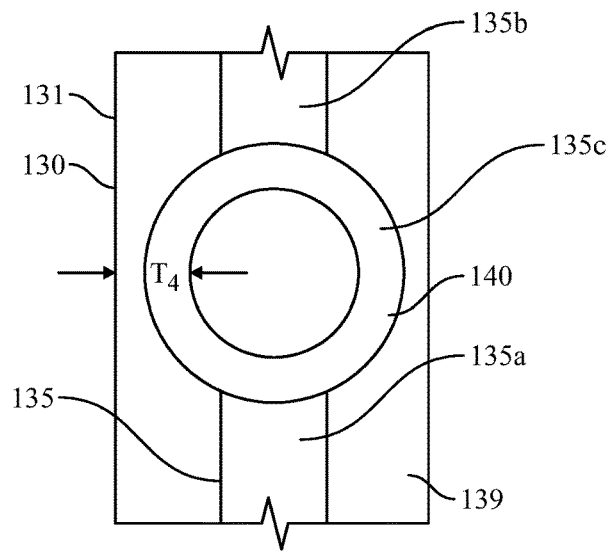

FIG. 4B is an edge view of FIG. 4A, absent outer annular rim 135, which illustrates the relative dimensions of inner annular rim 130 and the bottom of pocket 140, including pocket seat 135c and the termination of vacuum transmission passage 170a. The maximum diameter of seat 135c is about the same as thickness T2 of inner annular rim 130. The thickness T4 between the edge of vacuum transmission passage 170a and a side wall 131 of the inner rim 130 is small, for example only about 1 mm. Thickness T2 of inner annular rim is determined by the nominal diameter of the beads to be delivered by the system and preferably is greater than the nominal bead diameter by a minor fraction of the nominal diameter. For example, the thickness T2 can be from about 2 mm to about 4 mm, or from about 2.5 mm to about 3.5 mm. Advantageously, thickness T2 is approximately the same as or slightly greater than the diameter of a bead, such that when in-place, the edges of a bead are within the confines defined by the thickness T2 of the inner annular rim 130, but extend beyond the thickness T3 of outer annular rim 135. Thickness T4 is generally about 1 mm or less.

Figure 4C:
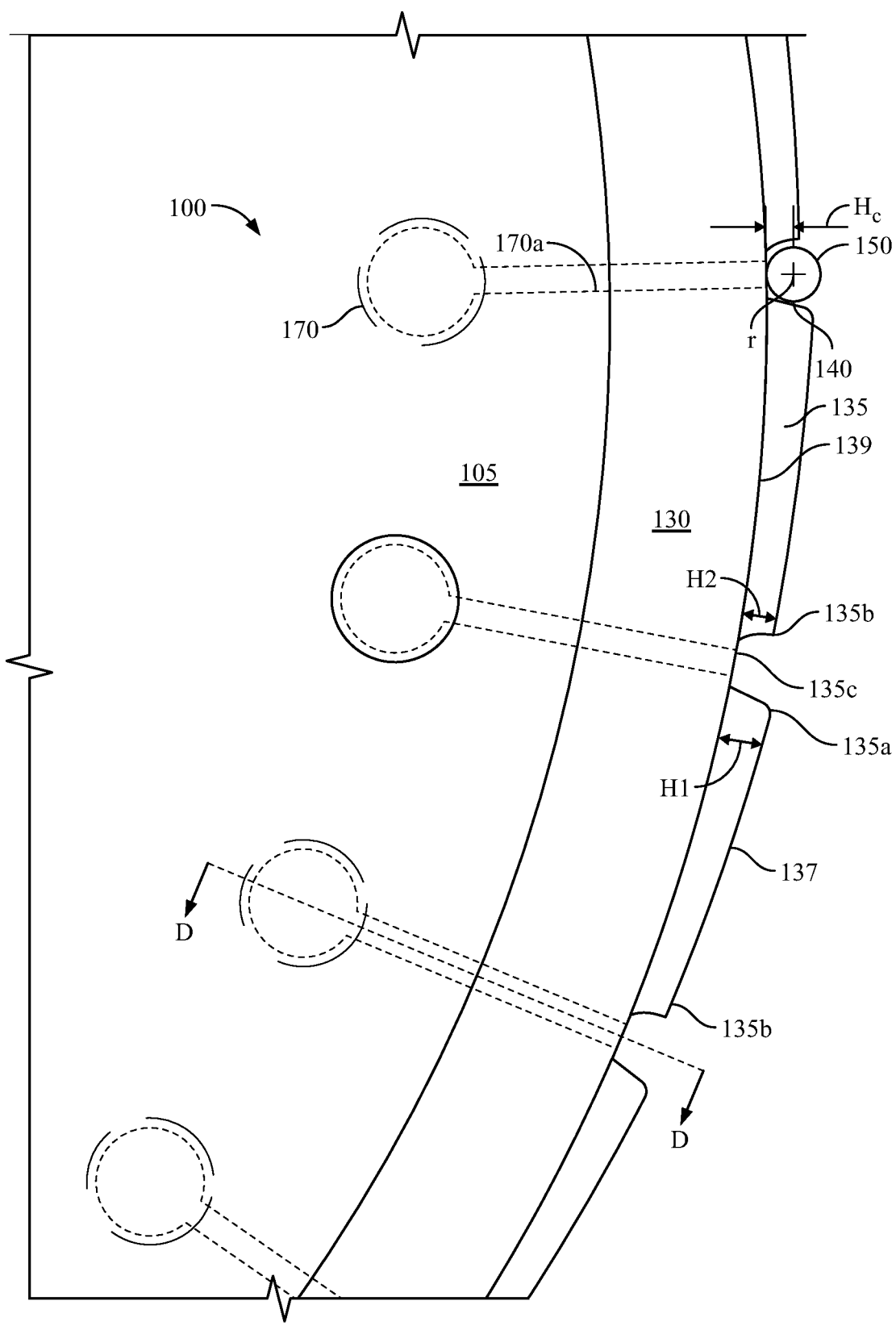

FIG. 4C is a front view of a portion of bead delivery disk 100 demonstrating the relationships of the various portions along the outer periphery of the disk. Central disk portion 105 is surrounded by an inner annular rim 130 and outer annular rim 135, and a series of pockets 140 are spaced along the periphery 139 of the inner annular rim 130, one of which is shown to contain a captured bead 150. Central disk portion 105 is axially perforated by vacuum transmission apertures 170, and radially perforated by vacuum transmission passages 170a which fluidly communicate with the apertures 170, both of which are shown in phantom lines in this view. Adjacent each pocket 140 are leading rim portions 135a and trailing rim portions 135b which are connected along the periphery of outer annular rim 135 by a tapering portion 137, which tapers radially inward from each trailing rim portion 135b to the succeeding leading rim portion 135a. Preferably, the heights H1 of the leading rim portions 135a are about 0.5 mm less than the height Hc of the center of a nominal bead 150 when retained in the pocket 140. The heights H2 of the trailing rim portions 135b are preferably about 0.5 mm greater than the height Hc, such that the center of the bead 150 is above the top of the leading rim portion 135a and below the top of the trailing rim portion 135b.

Figure 4D:
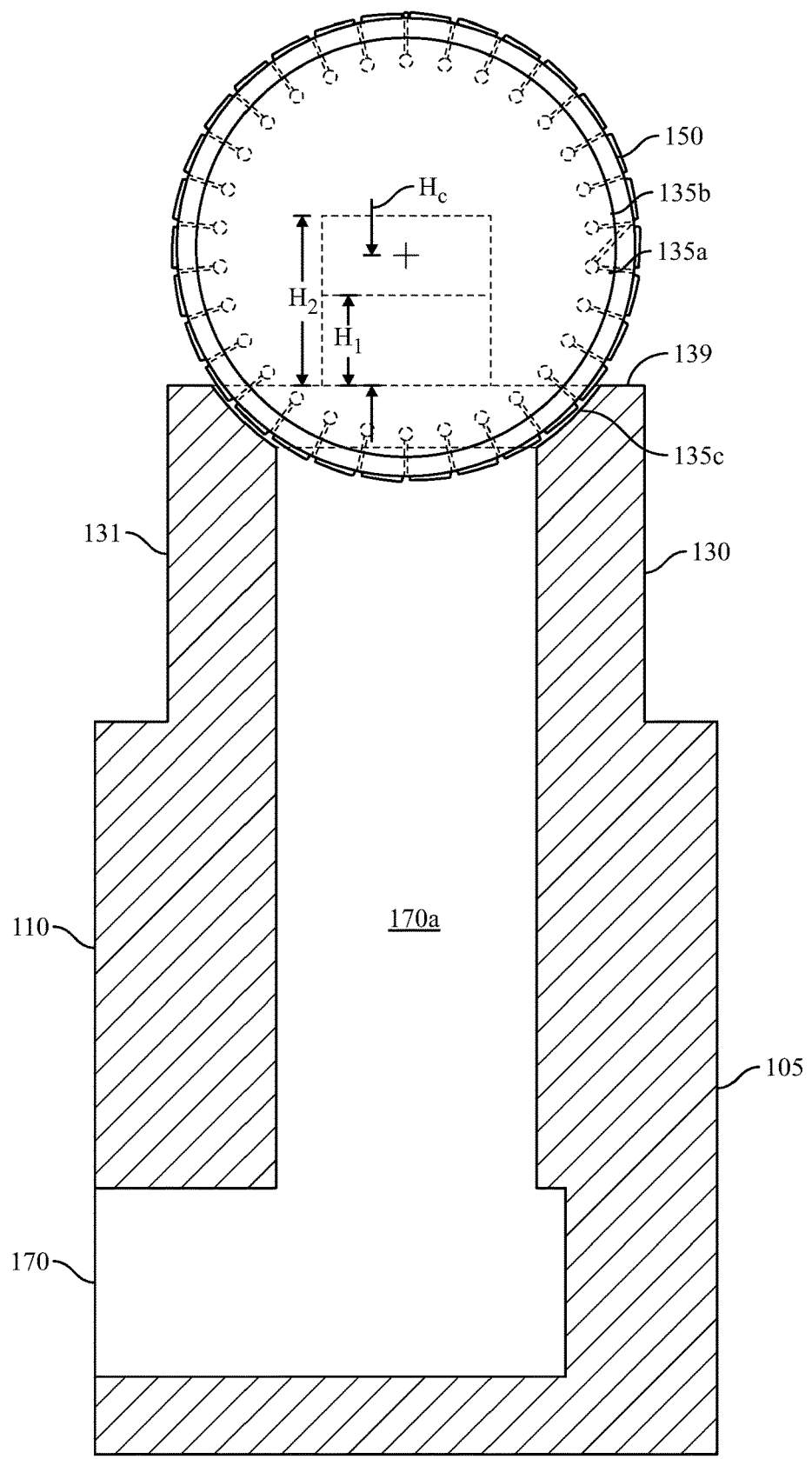

FIG. 4D is a section along line D, D' of FIG. 4C which shows the cross-sectional configuration of disk 100, from which it is clear that vacuum transmission apertures 170 are axially drilled or machined into the rear side 110 of central portion 105 of the disk, and that vacuum transmission passages 170a are radially drilled from the circumferential surface of inner annular rim 130 to meet and intersect with vacuum transmission apertures 170, forming continuous voids for vacuum or pressure transmission to the circumference of the inner annular rim 130. Likewise, the circumferential surface of inner annular rim 130 has spherical seats 135c machined therein at the termination of each vacuum transmission passage 170a, the radii of which conform to the radius r of a flavor bead 150 to be captured therein. Finally, the heights H1 and H2 of the leading 135a and trailing 135b rim portions of the outer rim 135, respectively, can be seen as they compare to the center of a captured bead 150. The height of the trailing rim portion 135b assures retention of a captured bead as it completes its movement through the hopper 520, described below.

Figure 5A:
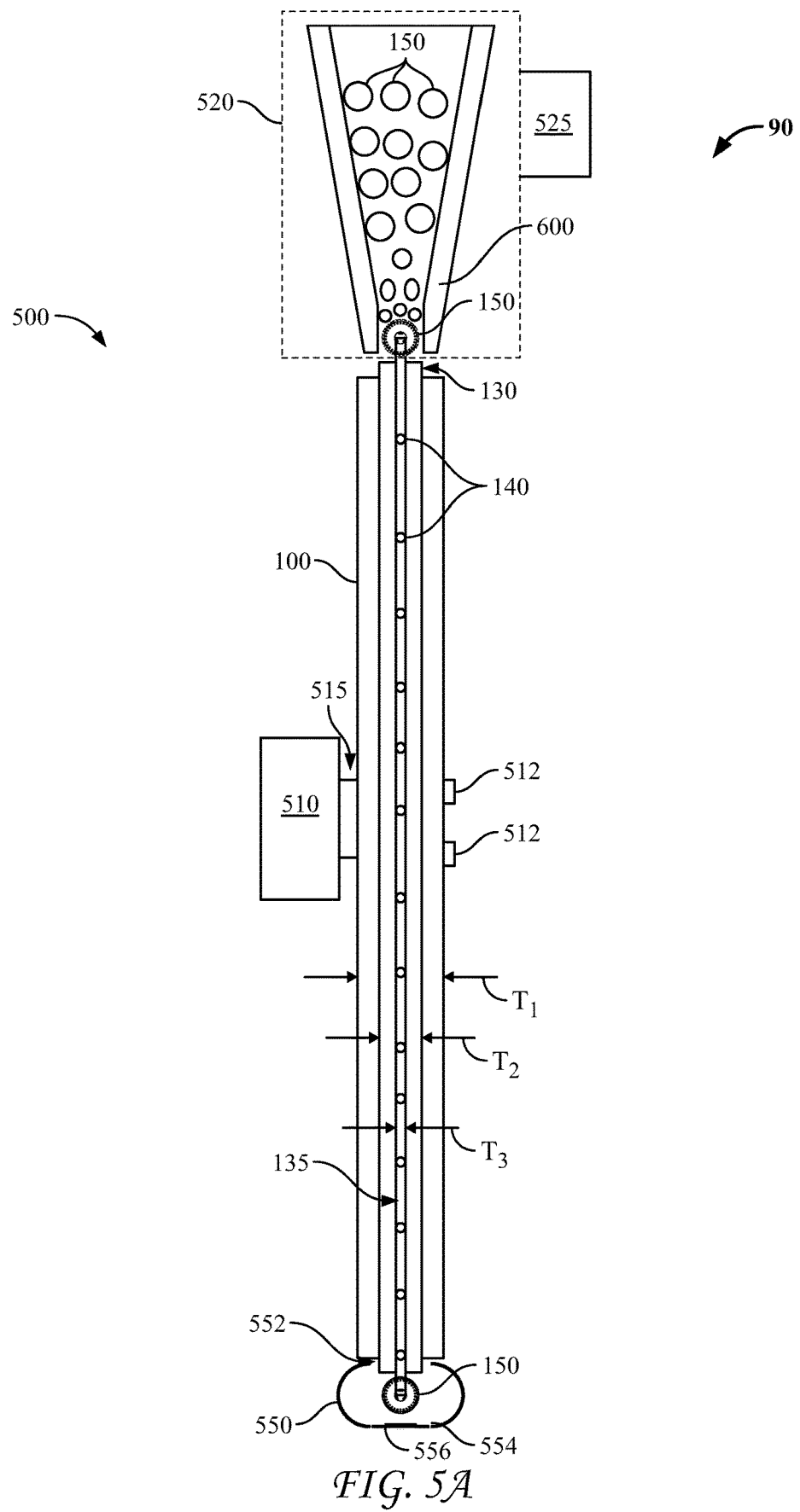
FIGS. 5A-5C show a bead delivery system according to the present disclosure.

In another form, FIG. 5A illustrates a bead delivery system having a bead source 90 in the form of a bin or hopper 520 for storing beads, such as a hopper equipped with a vibrator 525, a bead delivery disk 100 in communication with said bead source 520, the disk having a first central disk portion having a thickness T1, an inner annular rim 130 having a second thickness T2 less than said first thickness, and an outer annular rim 135 having a third thickness T3, a series of pockets 140 spaced around a periphery of the inner rim 130, and a bead receiving means 550 having a slot 552 at a top portion thereof of a width to freely accommodate the second thickness T2 of said inner annular rim 130 of said bead delivery disk 100 with adequate clearance for rotation of the disk therethrough, but narrower than said first central thickness T1. Beads 150 are shown both at the 12:00 location of the disk, being captured by a pocket in outer annular rim 135 within the bead source 520, and at the 6:00 location of the disk, to be deposited through slot 552 into a moving fibrous stream of material, such as a cellulose acetate tow (not shown) travelling through bead receiving means 550. The bead receiving means can be a tongue in a rod maker machine, and is shown in FIG. 5A with both a plug wrap 554 and a tube belt 556 along the bottom, both of which will be understood to be travelling perpendicular to the plane of the page, and at speeds which coordinate with the radial velocity of the outer circumference of the bead delivery disk 100, so as to deposit beads 150 with minimal disturbance of a surrounding tow material. Bead delivery disk 100 is centrally attached to a rotational driving means 510, such as a motor or a driven pulley, with bolts 512 passing through mounting apertures 180 and into shaft 515.

Figure 5B:
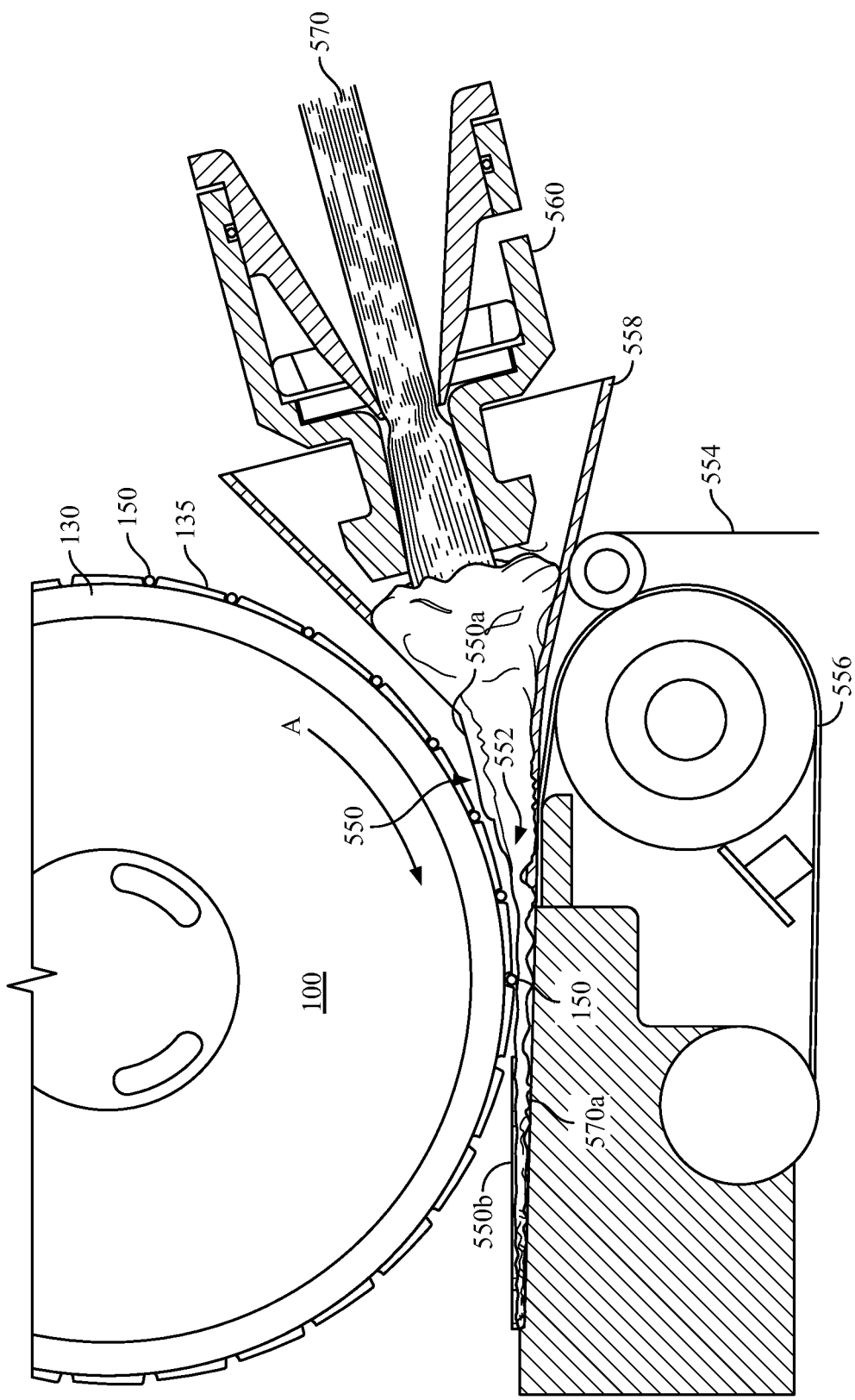

FIG. 5B shows a side view of a bead delivery disk 100 in place above a frusto-conical tongue 550 of a commercially available Hauni KDF-2 rod maker, which has a tow stuffer jet 560, a tow receiving funnel 558 downstream of the stuffer jet, and the tongue 550 downstream of the funnel. The tongue has upper and lower portions, a first wide end 550a, a second narrow end 550b, and a tow pathway generally through said lower portion, and is structured and arranged to receive and wrap a generally flat, moving tow 570 of fibrous material into a continuous cylinder or rod. According to the present disclosure, the tongue 550 is modified to have a slot 552 cut into its upper portion, which is just wide enough to admit at least a portion of the inner annular rim 130 of the bead delivery disk 100 into the central portion of the moving fibrous stream of material as it is being wrapped (converged) into a cylinder. In this way, the bead delivery disk 100 acts to vertically deposit beads 150 into the center of the cylindrical fibrous stream of material, just prior to it being wrapped with a plug wrap 554 or the like in a tube belt 556 passing along the lower portion of the tongue and disposed below the pathway for the moving fibrous stream of material. Advantageously, slot 552 is positioned closer to the second, narrow end 550b of said tongue than to said first, wide end 550a of the tongue, and has a width to freely admit the beads into the tongue 550 and tow 570. While not wishing to be bound by theory, it is believed that positioning of the slot 552 more towards the narrower, second end 550b of the tongue, in combination with the small thickness T2 of the inner annular rim 130 and even smaller thickness T3 of the outer annular rim 135, results in very accurate radial centering of beads 150 within the cylindrical tow 570a as the tow exits the tongue, largely due to the fact that the tow is allowed to flow around the upper circumference of the bead when each bead is deposited, leaving little room for it to be displaced. Additionally, the vertical disposition of the bead delivery disk 100 with respect to the tongue 550, in combination with the linear motion of the underlying plug wrap 554 and tube belt 556, which are also in concert with the directions of motion of both the incoming tow 570 and the arcuate motion of the beads 150 within the pockets 140 as they are delivered to the wrapping tow, further minimizes disturbance of the tow at the bead deposition site.

Figure 5C:
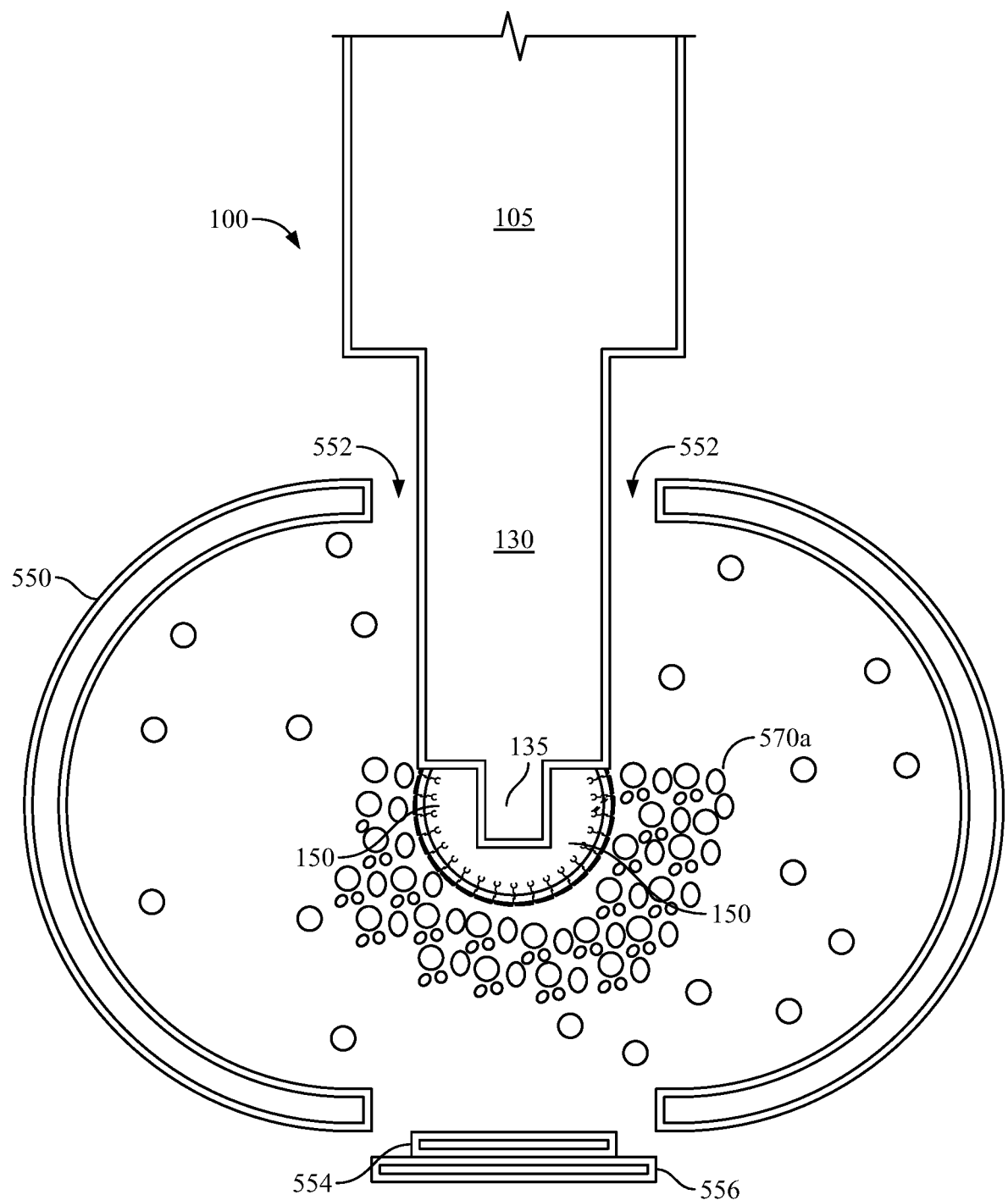

FIG. 5C is a detailed and exaggerated view of the bottom portion of FIG. 5A, which better shows the positioning of the edge of bead delivery disk 100 within the tongue 550. Inner annular rim 130 extends from central disk portion 105 and into slot 552, such that outer annular rim 135 can deposit bead 150 centrally within partially wrapped tow 570a, just above plug wrap 554 and tube belt 556. It should be understood that the partially wrapped tow 570a extends to the inner edges of tongue 550 and is radially compressed inwardly as it travels therethrough. As the bead 150 and the rims 130 and 135 enter the tongue, the trailing portion 135b and the leading portion 135a of the outer rim 135 protect the bead from impact with the tow stream to assure a more consistent positioning upon release of the bead into the tow stream. Because of the small size of outer annular rim 135, the partially wrapped tow stream 570a extends above the top of bead 150, and as bead 150 is deposited into the tow stream, it already has a portion of tow above it to further hold it essentially radially centered in the wrapping tow. Additionally, both the leading and trailing rim portions of the outer annular rim 135, together with the small size of the pocket seat 135c helps reduce snags of the tow stream with the empty pocket after the release of a bead.

The bead storage means 520 for the bead delivery system can take multiple forms. In a simple form the bead source can be an overhead bin or hopper, generally as illustrated in FIG. 5A. The hopper can be provided with a vibrator 525 to help maintain the beads separate from one another and to keep them in motion to facilitate capture by pockets 140 as they rotate through a slot in the bottom of hopper 520. In a preferred form, illustrated in FIG. 6A, the bead storage hopper 520 is provided with a machined insert 600 having a channel formed by angled sides 610 on either side of a lower slot 620 which has sufficient clearance for outer annular rim 135 and pockets 140 to rotate during the delivery portion of bead delivery disk rotation. It can also be advantageous if insert 600 is provided with a gas jet hole 630, through which pressurized gas such as air is injected into the insert to help avoid jamming of beads against the exit end of the channel.

Figure 6A:
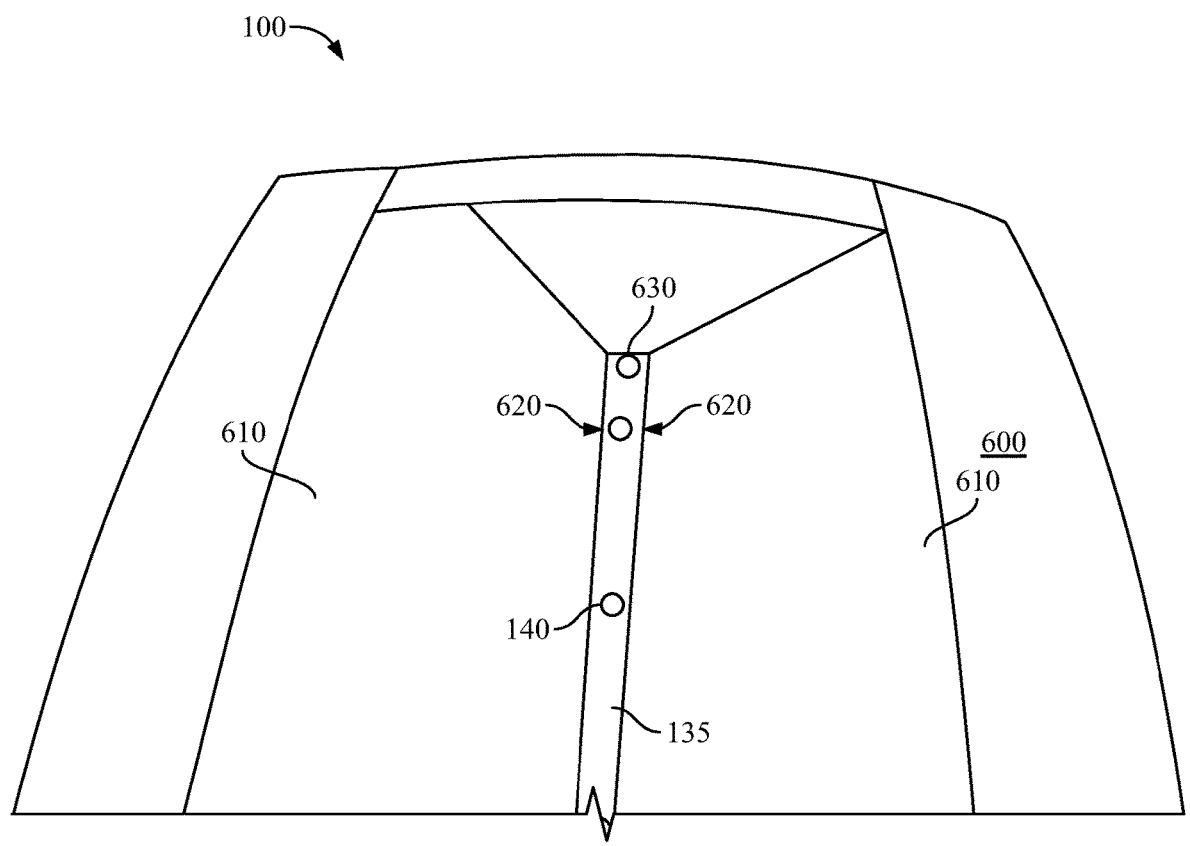
FIGS. 6A and 6B show different bead sources according to the present disclosure.
Figure 6B:
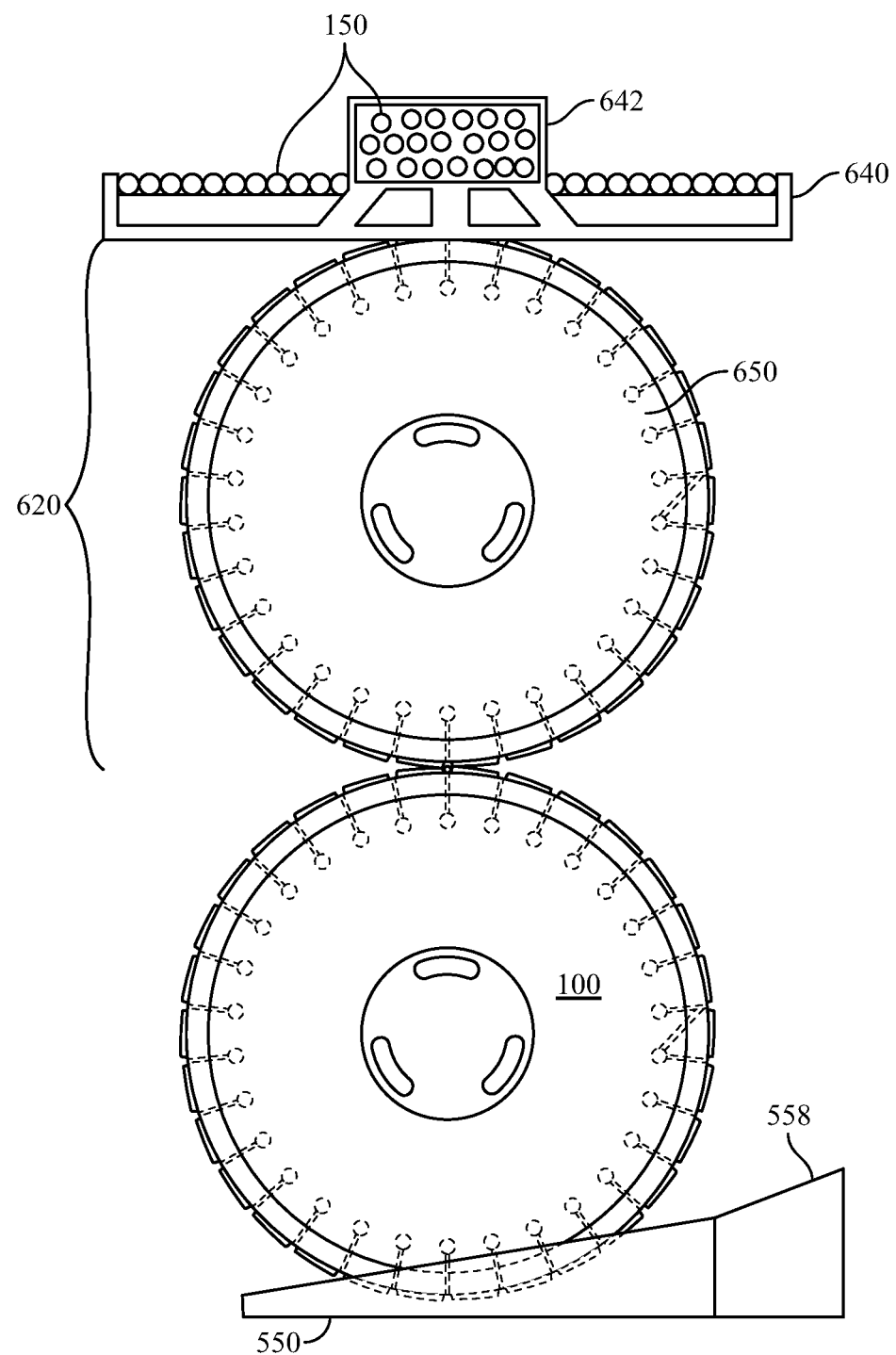

In an alternative embodiment, the bead source can be configured for high speed delivery of beads to the delivery disk 100 and its pockets 140. Bead delivery from a bead storage hopper, described above, is limited by the time it takes for each bead to fall and/or be vibrated into a pocket 140 and be captured by the bead delivery disk. Because the timing of this operation is somewhat uncertain, the rotational speed of the bead delivery disk must be limited to be certain of bead capture. FIG. 6B illustrates a bead source 620 configured for higher speed operation of the bead delivery system, wherein an overhead accumulator wheel 640 having a central bead reservoir 642 is rotated in concert with an underlying bead transfer wheel 650, which is likewise rotated in concert with bead delivery disk 100 according to the present disclosure. It should be understood that accumulator wheel 640 is offset from the vertical plane of bead transfer wheel 650 and bead delivery disk 100, such that only the peripheral edge of accumulator wheel 640 is in communication with underlying bead transfer wheel 650. Upon rotation of accumulator wheel 640, a series of flavor beads 150 stored in central reservoir 642 are delivered along a series of radial spokes of the accumulator wheel, such that a bead is always at the end of each spoke and available for delivery to vacuum-assisted pockets in transfer wheel 650. In this manner centrifugal force acts to deliver beads individually to the end of the spokes at the peripheral rim of the accumulator wheel, and the rotational speed of the accumulator wheel 640 can be synchronized with the rotational speed of the transfer wheel 650, such that each accumulator wheel spoke aligns with a pocket in the transfer wheel, and a bead is positively and predictably delivered to each pocket of the transfer wheel 650. Examples of suitable high speed bead feeders can be found in U.S. Pat. Nos. 7,975,877 and 8,381,947, both of which are incorporated by reference herein in their entireties. Likewise the rotational speed of the transfer wheel can be readily synchronized with the bead delivery disk 100, such that each pocket is positively and predictably loaded with a flavor bead.

In another form, disclosed herein is a process for accurately positioning beads, such as flavor beads within a rod, by vertically delivering a bead into a moving stream of a fibrous material as it is wrapped into a continuous rod or cylinder within a frusto-conical tongue. One aspect of accomplishing this goal is to deliver beads which are disposed within a series of pockets along a circumferential edge of a bead delivery disk having a circumference and a first central thickness, an inner annular rim having a second thickness less than said first thickness, and an outer annular rim having a third thickness less than said second thickness, wherein the series of pockets around said circumference pass axially through said third thickness. Advantageously, the delivery system is structured such that the upper portion of the tongue has a slot having a width sufficient to freely admit the beads into said moving stream of a fibrous material, but narrower than said first central thickness of said bead delivery disk. In another form, the slot has a width sufficient for accommodating the inner annular rim of said bead delivery disk, and is positioned within an upper edge of said tongue and closer to a second, narrower end of said tongue than to a first, wider end of said tongue. Accordingly, the beads are delivered into said moving stream of fibrous material as closely as possible to a point at which a continuous rod thereof is formed within the tongue, such that the beads are immediately wrapped into said continuous rod and constricted from radial and/or linear displacement within the rod.

It is advantageous if the beads are held in the pockets by vacuum until being delivered into said moving stream of fibrous material with a positive pressure blast of gas, such as air. Likewise, the delivery rate of the flavor beads can be matched to the speed of the moving stream of fibrous material drawn through the tongue, along with a wrap tube disposed below said rod or tow. In a preferred embodiment, the bead delivery disk is vertically rotated in communication with an overhead bead source, such that the beads are individually delivered into each pocket, and the delivery disk and pockets have vacuum applied to them until a bead is delivered into said moving stream of fibrous material with a positive pressure blast of gas. In one embodiment, the bead source is a vibrating overhead hopper or bin having a slot with a width to accommodate said beads and at least the outer annular rim of said delivery disk. In an alternative embodiment, the bead source can be one or more rotatable wheels having a central bead reservoir structured to deliver a series of individual beads in a radial direction by virtue of centrifugal force of the rotating wheel, such as a series of beads delivered along a series of spokes extending from the central bead reservoir to the peripheral edge of the wheel.

The foregoing teachings may be applied to tobacco rod formation wherein a tobacco rod is formed using a tongue and garniture arrangement akin to those described above with respect to the described, exemplary filter rod forming techniques and machinery.

Illustrative, non-exclusive examples of apparatus, systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

PCT1. A bead delivery disk comprising: a central disk portion having front and back sides and a first central thickness; an inner annular rim around the central disk portion, said inner annular rim having a second thickness less than said first thickness; a series of pockets spaced around said inner annular rim; and multiple vacuum transmission apertures located on one side of said disk, each aperture communicating with at least one of said pockets.

PCT2. The bead delivery disk of paragraph PCT1, wherein said vacuum transmission apertures are located in a circular pattern around said back side of said central disk portion, radially inside of said inner annular rim.

PCT3. The bead delivery disk of paragraphs PCT1 or PCT2, wherein said vacuum transmission apertures are perforations on the surface of said back side which fluidly communicate with the pockets through passages inside said disk.

PCT4. The bead delivery disk of any preceding paragraph, further comprising a semi-annular vacuum plenum affixed to the back side of said disk covering said vacuum transmission apertures and having one or more vacuum delivery ports provided therein.

PCT5. The bead delivery disk of paragraph PCT4, wherein an upper terminus of the vacuum plenum is located at about zero degrees on top of the back side of said disk and a lower terminus of said vacuum plenum is located at about 165 degrees relative to the top and front side of the disk.

PCT6. The bead delivery disk of paragraphs PCT4 or PCT5, further comprising a pressurized gas delivery means located at about 180 degrees relative to the top of the disk.

PCT7. The bead delivery disk of any preceding paragraph, wherein the pockets are each sized to pick up and deliver a single bead.

PCT8. The bead delivery disk of any preceding paragraph, further comprising an outer annular rim disposed about said inner annular rim, wherein each pocket is disposed between a leading rim portion and a trailing rim portion of said outer annular rim, said outer annular rim having a third thickness less than said second thickness.

PCT9. The bead delivery disk of paragraph PCT8, wherein the beads to be picked up and delivered have a nominal diameter greater than said third thickness and less than said second thickness.

PCT10. The bead delivery disk of any preceding paragraph, wherein each pocket has a spherical seat formed on the inner annular rim between said leading and trailing rim portions of the outer annular rim of the disk, each seat communicating with a passage disposed within the disk.

PCT11. The bead delivery disk of paragraph PCT10, wherein each passage communicates with a single vacuum transmission aperture.

PCT12. The bead delivery disk of paragraphs PCT10 or PCT11, wherein a center of a nominal bead is disposed a first height Hc above an outer periphery of said inner annular rim when said nominal bead is seated in said pocket, said trailing rim portion having a height greater than said first height Hc, and said leading rim portion having a height less than said first height Hc.

PCT13. A bead delivery system, comprising: a source of beads; a bead delivery disk in communication with said bead source, comprising: a central disk portion having front and back sides and a first central thickness, an inner annular rim around the central disk portion, said inner annular rim having a second thickness less than said first thickness, a series of pockets spaced around said inner annular rim, and multiple vacuum transmission apertures located in a generally circular pattern around one side of said disk, each aperture communicating with at least one of said pockets; and a bead receiving means structured to receive beads from the pockets of the bead delivery disk into a moving rod or tow.

PCT14. The bead delivery system of paragraph PCT13, wherein said bead receiving means further comprises: a stuffer jet; a receiving funnel downstream of said stuffer jet; a frusto-conical tongue downstream of said funnel, said tongue having: a first wide end, a second narrow end, upper and lower portions between said ends, a pathway through said lower portion, and a slot in said upper portion of a width to freely accommodate the second thickness of said inner annular rim of said bead delivery disk, but narrower than said first central thickness, wherein said tongue is structured and arranged to receive and wrap a generally flat, moving stream of fibrous material into a continuous cylinder; and a tube belt passing along the lower portion of the tongue and disposed below the pathway.

PCT15. The bead delivery system of paragraph PCT 14, wherein said slot is positioned closer to said second, narrow end of said tongue than to said first, wide end of said tongue.

PCT16. The bead delivery system of any of paragraphs PCT13 to PCT15, wherein said bead receiving means comprises a slot having a width to freely admit said beads into said moving stream of fibrous material.

PCT17. The bead delivery system of any of paragraphs PCT13 to PCT16, wherein said vacuum transmission apertures are located on the back side of said disk, radially inside of said inner annular rim.

PCT18. The bead delivery system of any of paragraphs PCT13 to PCT17, wherein said vacuum transmission apertures are perforations on the surface of said back side which fluidly communicate with the pockets on the circumference of the disk through passages inside said disk.

PCT19. The bead delivery system of any of paragraphs PCT13 to PCT18, further comprising a semi-annular vacuum plenum affixed to the back side of said disk covering said vacuum transmission apertures, and having one or more vacuum delivery ports provided therein.

PCT20. The bead delivery system of paragraph PCT19, wherein an upper terminus of the vacuum plenum is located at about zero degrees on top of the back side of said disk and a lower terminus of said vacuum plenum is located at about 165 degrees relative to the top and front side of the disk.

PCT21. The bead delivery system of paragraph PCT20, further comprising a pressurized gas delivery means located at about 180 degrees relative to the top of the disk.

PCT22. The bead delivery system of any of paragraphs PCT13 to PCT21, wherein the pockets are each sized to pick up and deliver a single bead, said bead delivery disk further comprising an outer annular rim disposed about said inner annular rim, wherein each pocket is disposed between a leading rim portion and a trailing rim portion of said outer annular rim, said outer annular rim having a third thickness less than said second thickness.

PCT23. The bead delivery system of paragraph PCT22, wherein the beads to be picked up and delivered have a nominal diameter greater than said third thickness and less than said second thickness.

PCT24. The bead delivery system of any of paragraphs PCT13 to PCT23, wherein each pocket has a spherical seat formed on the inner annular rim and between leading and trailing rim portions of the outer annular rim of the disk, each seat communicating with a passage disposed within the disk.

PCT25. The bead delivery system of any of paragraphs PCT18 to PCT24, wherein each passage communicates with a single vacuum transmission aperture.

PCT26. The bead delivery system of either of paragraphs PCT24 to PCT25, wherein a center of a nominal bead is disposed a first height Hc above an outer periphery of the inner annular rim when the nominal bead is seated in the pocket, the trailing rim portion having a height greater than the first height Hc, and the leading rim portion having a height less than the first height Hc.

PCT27. The bead delivery system of any of paragraphs PCT13 to PCT26, wherein said bead source is a vibrating hopper containing beads positioned vertically above said bead delivery disk.

PCT28. The bead delivery system of any of paragraphs PCT13 to PCT26, wherein said bead source comprises an accumulator wheel having a central bead reservoir and a series of radial spokes extending from the reservoir, said accumulator wheel positioned above a transfer wheel having pockets for said beads on a circumferential edge thereof, such that the end of each spoke communicates with a pocket on the circumferential edge of the transfer wheel.

PCT29. A process of positioning a bead within a rod of fibrous material comprising drawing a stream of fibrous material through a frusto-conical tongue of a rod forming apparatus; capturing and registering a bead on a pocket at a location along a periphery of a delivery disk with vacuum by rotating said disk and moving said pocket through a source of beads; releasing said bead at a desired position in said drawn stream of fibrous material by further rotating said delivery disk and further moving said captured bead through said frusto-conical tongue; and maintaining registry of said captured bead in said pocket during at least one of said moving and further moving by disposing leading and trailing outer rim portions adjacent said pocket, said rim portions having a width less than a nominal diameter of said bead.

PCT30. The process of paragraph PCT29, wherein said periphery has a width greater than said nominal diameter by a minor fraction of said nominal diameter.

PCT31. The process of paragraphs PCT 29 or PCT30, wherein a delivery rate of said beads is matched to a speed of the stream of fibrous material as it is drawn through said tongue.

PCT32. The process of any of paragraphs PCT29 to PCT 31, further comprising wrapping said bead into said drawn stream of fibrous material as they exit the frusto-conical tongue and form a continuous rod.

PCT33. The process of any of paragraphs PCT30 to PCT 32, wherein said delivery disk is vertically rotated in communication with said source of beads, said beads are individually delivered into each pocket, and said delivery disk and pockets have vacuum applied to them until a bead is delivered into said drawn stream of fibrous material with a positive pressure blast of gas.

PCT34. A bead delivery disk comprising a disk having front and back sides, a circumference and a first central thickness; an inner annular rim around the circumference of said disk having a second thickness less than said first thickness; an outer annular rim around a circumference of said inner annular rim having a third thickness less than second thickness; and a series of pockets spaced around said inner rim connectable to a vacuum source.

PCT35. The bead delivery disk of PCT34, wherein the outer annular rim comprises leading and trailing rim portions disposed on either side of each pocket, said leading rim portions having diminished heights relative to heights of said trailing rim portions, and the trailing rim portions have heights greater than about one half a nominal diameter of a bead to be delivered by said bead delivery disk, and the leading rim portions have heights less than about one half the nominal diameter.

PCT36. The bead delivery disk of PCT34 or PCT35, wherein each pocket has a spherical seat formed on the inner annular rim and between the leading and trailing rim portions on the outer annular rim, each seat communicating with a passage disposed within the disk.

PCT37. A rotatable disk for repetitively delivering beads of a nominal diameter, comprising a central disk portion of a first thickness, said central disk portion providing an annular vacuum array; an inner rim portion disposed about said central disk portion having a second thickness less than said first thickness, said second thickness greater than said nominal diameter by a minor fraction of said nominal diameter, said inner rim portion including an array of pockets at spaced locations along an outer circumference of said inner rim; for each said pocket, a vacuum passage structured to communicate vacuum to said pocket from said vacuum array; and an outer rim portion disposed about said inner rim portion having a third thickness less than said nominal diameter, said outer rim portion comprising a leading rim portion and a trailing rim portion adjacent each pocket, said trailing and leading rim portions abating disturbance of a bead retained in a respective pocket as said pocket is moved through a fibrous stream during a rotation of said disk.

While the present disclosure has been described and illustrated by reference to particular embodiments, those of ordinary skill in the art will appreciate that the disclosure lends itself to variations not necessarily illustrated herein. For this reason, then, reference should be made solely to the appended claims for purposes of determining the true scope of the present disclosure.

What is claimed:

1. A bead delivery disk comprising:
   a central disk portion having a front side, a back side and a first thickness;
   an inner annular rim around the central disk portion, the inner annular rim between the front side and the back side and offset in a perpendicular direction from the front side and the back side, the inner annular rim having a second thickness less than the first thickness;
   a plurality of pockets spaced around the inner annular rim;
   an outer annular rim disposed around an outer periphery of the inner annular rim, the outer annular rim including,
      a leading rim having a first height with respect to an outer periphery of the inner annular rim, and
      a trailing rim having a second height with respect to the outer periphery of the inner annular rim, the second height different than the first height, each of the plurality of pockets disposed between the leading rim and the trailing rim; and
   a plurality of apertures located on one side of the central disk portion, each of the plurality of apertures communicating with at least one of the plurality of pockets.

2. The bead delivery disk of claim 1, wherein the plurality of apertures are located in a generally circular pattern around the back side of the central disk portion, radially inside of the inner annular rim.

3. The bead delivery disk of claim 1, wherein the plurality of apertures are perforations on a surface of the back side which fluidly communicate with the plurality of pockets through passages inside the central disk portion.

4. The bead delivery disk of claim 1, further comprising:
   a semi-annular vacuum plenum affixed to the back side of the central disk portion covering the apertures and having one or more vacuum delivery ports provided therein.

5. The bead delivery disk of claim 4, wherein an upper terminus of the vacuum plenum is located at about zero degrees on top of the back side of the central disk portion.

6. The bead delivery disk of claim 5, further comprising:
   a pressurized gas delivery means located at about 180 degrees relative to the top of the central disk portion.

7. The bead delivery disk of claim 1, wherein the each of the plurality of pockets is sized to pick up and deliver a single bead.

8. The bead delivery disk of claim 1, wherein the outer annular rim has a third thickness less than the second thickness.

9. The bead delivery disk of claim 8, wherein beads to be picked up and delivered have a nominal diameter greater than the third thickness and less than the second thickness.

10. The bead delivery disk of claim 8, wherein each of the plurality of pockets has a spherical seat formed on the inner annular rim between the leading rim and trailing rim of the outer annular rim, each seat communicating with a passage disposed within the central disk portion.

11. The bead delivery disk of claim 10, wherein each passage communicates with a single aperture of the plurality of apertures.

12. The bead delivery disk of claim 10, wherein
   a center of a nominal bead is disposed a third height above an outer periphery of the inner annular rim when the nominal bead is seated in a pocket of the plurality of pockets,
   the second height is greater than the third height, and
   the first height is less than the third height.

* * * * *